Nov. 15, 1966  A. T. HOLDEN  3,286,271
CHART POSITION INDICATING APPARATUS
Filed Sept. 4, 1964  2 Sheets-Sheet 1
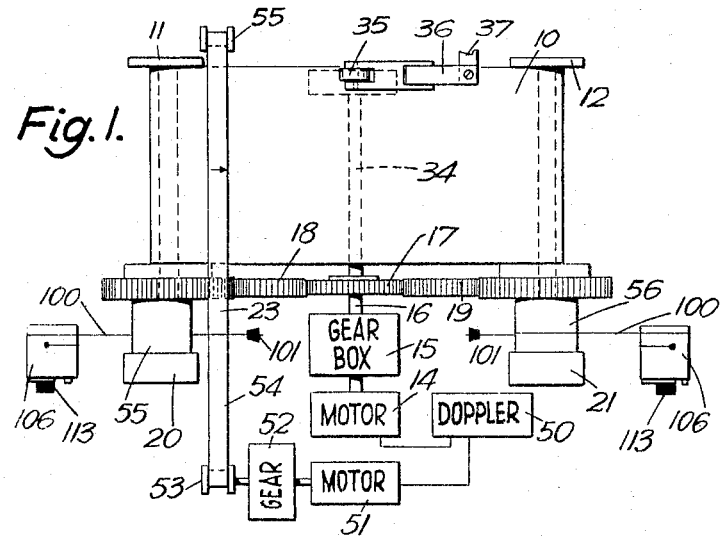
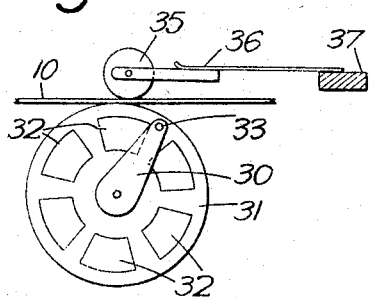
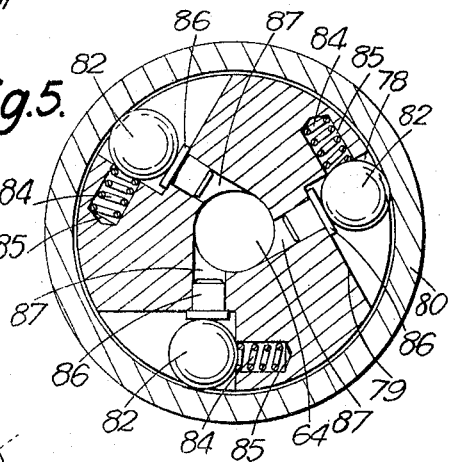
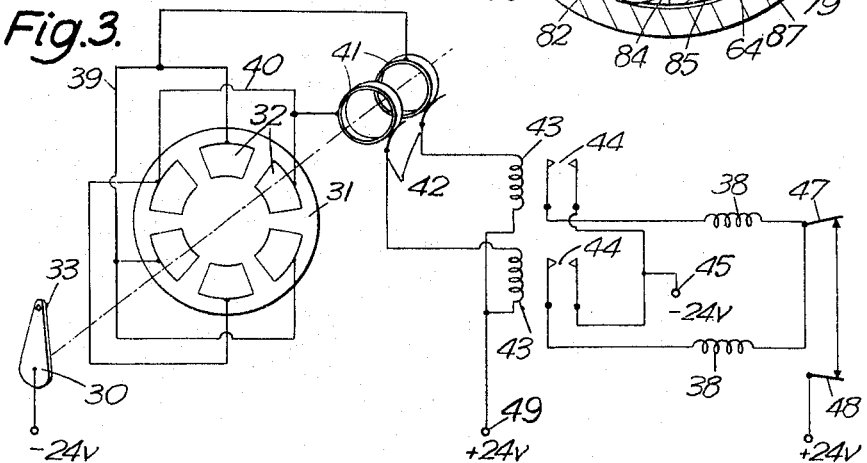

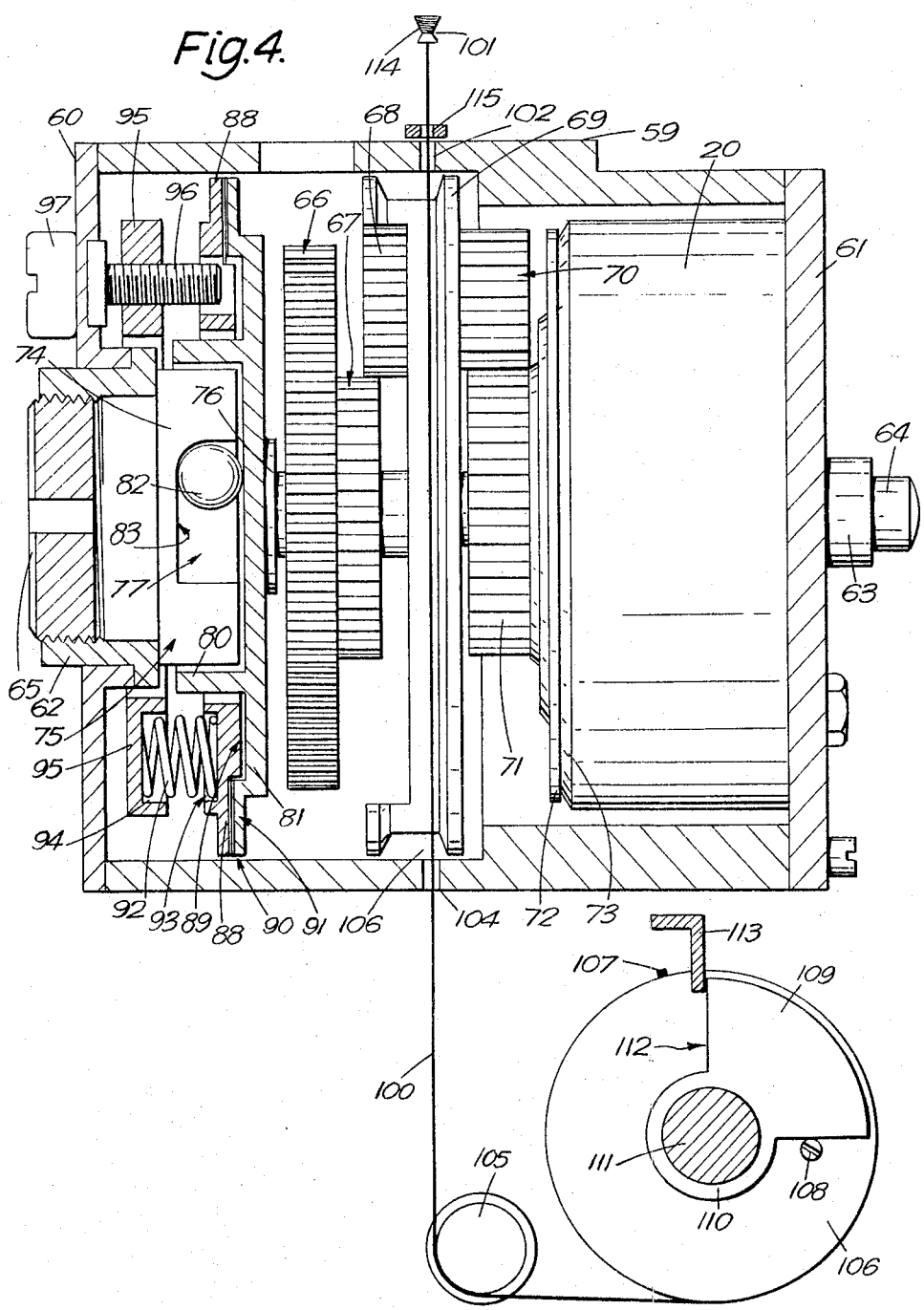

United States Patent Office 3,286,271
Patented Nov. 15, 1966

3,286,271
CHART POSITION INDICATING APPARATUS
Alfred Thomas Holden, London, England, assignor to Decca Limited, London, England, a British company
Filed Sept. 4, 1964, Ser. No. 394,398
12 Claims. (Cl. 346—8)

This application is a continuation-in-part of my prior application Serial No. 199,936 filed on 1st June, 1962 and now abandoned.

This invention relates to apparatus having a chart in the form of a strip carried on spools which chart is traversed past an indicating or marking stylus.

When a chart strip is wound onto a spool the effective diameter changes as the layers of chart build up on the spool and thus the linear speed of the chart is not uniformly proportional to the drive speed for the spool. In such apparatus therefore it has been the usual practice to use charts with perforations engaged by a sprocket wheel or wheels for driving the chart so that the chart speed can be accurately controlled in accordance with a required drive speed.

The necessity for providing sprocket holes may be avoided by providing, in apparatus having a chart in the form of a strip carried on spools which chart is traversed past an indicating or marking stylus, a first rotatable member frictionally engaging the chart to be driven thereby as the chart moves, a second rotatable member, means for turning said second rotatable member in accordance with the required movement of the chart, spool drive means including a clutch which drive means, when the clutch is engaged, traverse the chart at a speed greater than the required maximum speed of traverse of the chart relative to the stylus and comparator means operative to disengage said clutch when the rotational movement of said first rotatable member exceeds the rotational movement of said second rotatable member so that the actual chart movement corresponds to the rotation of said second rotatable member. This arrangement avoids any necessity for sprocket holes in the chart. The chart merely has frictionally to engage and drive a rotatable member and the clutch forms in effect a slipping device controlled by the comparator means so that the drive to the spool slips sufficiently to maintain the chart movement exactly in accordance with the required movement. By avoiding the necessity for sprocket holes in this manner, the preparation of charts for use in the apparatus is very much simplified.

With apparatus of the kind described above, the spool which is trailing, that is to say, having chart wound off it, tends to overrun if the drive to the winding spool decelerates or stops. This overrunning may be avoided by applying friction resisting rotation of a spool, but if such friction is applied all the time, the drive mechanism must work against the friction and needs to be of substantially greater power.

It is an object of this invention to provide an improved drive system which incorporates, for each spool which may alternatively wind on or wind off chart, a friction brake operative to apply friction resisting rotation of the spool only when chart is being wound off that spool. By not applying friction when the chart is being wound onto a spool, the power required to drive the spools may be substantially reduced.

It is a further object of this invention to provide an airborne dead reckoning computer by arranging the chart to be driven in accordance with the speed of the aircraft.

A further object of this invention is to provide for the chart and an indicating stylus to be traversed in accordance with information from Doppler airborne navigation equipment. In such an arrangement the chart may be moved in accordance with the component of the determined speed of the aircraft in one direction and the stylus may be moved across the chart in a direction at right angles to the movement of the chart in accordance with the component of the determined speed in that direction.

A still further object of this invention is to provide a manually operated resetting mechanism whereby the chart may be traversed in either direction.

The foregoing and other objects and features of the invention will be apparent or will be referred to in the following description, reference being made to the accompanying drawings, in which:

FIGURE 1 is a diagram illustrating one form of chart position indicating apparatus;

FIGURE 2 is a diagram illustrating an electrical contact mechanism employed in the apparatus of FIGURE 1;

FIGURE 3 is a circuit diagram illustrating an electrical circuit employed in the apparatus of FIGURE 1;

FIGURE 4 is a diagrammatic view of the driving mechanism associated with each spool and, FIGURE 5 is a sectional view of the central portion of the mechanism shown in FIGURE 4.

Referring to FIGURE 1 there is shown diagrammatically a chart position indicating apparatus for use on an aircraft comprising a long strip chart 10 carried on two spools 11, 12. The chart 10 is formed by cutting and joining appropriate maps to produce a long strip covering the route of the aircraft and the two ends of this strip are then wound on the two spools 11, 12. By driving one or other of these spools to wind up the chart on the spool, the chart can be driven in one direction or other with respect to a stylus 13 to be described in further detail later. A single electric motor 14 is provided for alternatively driving either of the two spools so that the chart can be traversed in either direction by this single motor. The motor drives the spools through an adjustable speed gear 15 which has an output shaft 16 carrying a gear wheel 17. This wheel 17 through two gear trains 18, 19 drives respectively the input members of two chart drive units 55, 56 having electromagnetically controlled clutches 20, 21 respectively. The output members of the chart drive units 55, 56 are coupled to the respective spools 11, 12 so that when either of the clutches 20, 21 is engaged, the associated spool is driven. As will be described later, only one clutch at a time can be engaged. If the motor 14 was a constant speed motor and one of the clutches was left engaged, the arrangement thus far described would serve to drive the chart at a speed which would vary according to the amount of chart rolled up on the takeup spool. To control the actual movement of the chart there is provided a comparator device comprising a contact arm 30 (FIGURE 2) which cooperates with a disc 31 having six (or any other even number) radially extending metal segmental contacts 32 forming electrical contacts which contacts are electrically insulated from one another. The arm 30 carries a cooperating contact 33 which can make electrical contact with any one of the contacts 32 depending on the relative positions of the arm and disc. The arm 30 is driven from the aforementioned output shaft 16 of the gear box 15 by means of a shaft 34 as shown in FIGURE 1. The disc 31 is illustrated as frictionally engaging the chart 10 along one edge thereof and, to ensure good frictional contact, the chart 10 is held down on the disc 31 by means of a roller 35 carried on one end of a spring arm 36 the other end of which is secured to a fixed member 37, the spring arm being arranged to urge the roller 35 downwardly to press the chart 10 onto the surface of the disc 31. By this arrangement the disc 31 rotates in accordance with the actual movement of the chart strip 10. Although the contact strips 32 are illustrated as being on a disc 31 directly driven by frictional engagement with the chart, it may be preferable in some cases to have a friction wheel which engages the chart and which drives a contact carrying element through stepup gearing so as to increase the angular movement of the contacts 32 for a given movement of the chart 10.

The contact arm 30 is driven at the speed corresponding to the required speed of traverse of the chart, this being controlled by the motor 14 and the setting of the gear 15. The gear trains 18, 19 are so arranged that, whatever the amount of chart wound on the takeup spool, the spool if driven continuously through the gear train and the chart drive unit would pull the chart faster than the speed called for by the rotation of the shaft 34. The clutches 20, 21 are electrically controlled by the circuit illustrated in FIGURE 3 in order to counteract any gain in the movement of the chart due to the takeup spool tending to move the chart faster than is required. These two clutches are electrically-controlled and may be magnetic clutches or ratchet wheels with solenoid-operated pawls. Referring to FIGURE 3, the operating coils of the two clutches are shown at 38. In the particular arrangement illustrated, the contact element 33 normally remains in a datum position on one of the contacts 32 on the disc 31. Alternate contacts 32 are connected to two separate circuits 39, 40 which are led out through slip rings 41 and brushes 42 to the ends of two separate relay coils 43. The other ends of these coils 43 are connected together and to a positive supply terminal 49. The negative supply terminal is connected to the arm 30. Thus, when the contact 33 is on one of the contacts 32, one or other of the relay coils 43 is energised. The contacts 44 of the relay will be closed to complete a circuit from a negative supply terminal 45 through the associated one of the clutch coils 38 to a positive supply terminal 46, provided that two series connected switches 47, 48 are closed. As will be described later, these switches are normally closed when the apparatus is in operation. If there is any relative motion between the contact arm 30 and the disc 31, the contact element 33 will move off one of the contacts 32 onto one or other of the adjacent insulating portions of the disc 31 and so will break one or other of the electrical circuits 39, 40 and so cause the engaged clutch to be disengaged. The circuits 39, 40 might be arranged directly to interrupt the supply circuit to the clutch if the clutch is magnetically held in the engaged position but in the arrangement of FIGURE 3, these circuits 39, 40 control relays 43 which switch the clutch supply circuit to cause the clutch to be disengaged. Alternatively a transistor switching circuit may be used instead of relays. Only one clutch at a time can be energised depending on which of the alternate contacts on disc 31 engages the contact element 33. It will be appreciated that, since as previously explained, the chart would normally be moved too fast by the takeup spool, the disc 31 will always tend to rotate slightly faster than the arm 30 and hence for one direction of travel the contact arm will move relative to the disc in one direction from the datum position whilst for the other direction of travel the contact arm will move relative to the disc in the other direction. Only one clutch at a time can be operative and the action of the contact arm 30 and disc 31 is to disengage the operative clutch when the contact arm 30 moves off the contact 32 onto one of the insulating segments between the contacts 32. The disengagement of the clutch causes the chart to cease moving and the contact arm 30 will then move relatively to the now stationary disc 31 to return to the datum position with the contact 33 on the contact segment 32. When it has moved back to the datum position, the clutch will be engaged again. This control system and clutch thus in effect forms a slipping device controlled by the electrical contact elements so that the drive to the spool slips sufficiently to maintain the movement of the chart 10 exactly in accordance with the rotational movement of the contact arm 30.

The motor 14 is a reversible motor and is driven in one or other direction according to the required direction of movement of the chart strip. The motor drives the arm 30 in the appropriate direction and the arm will therefore tend to takeup a position on the edge of one of the contact segments 32 controlling the clutch for that direction of motion.

In FIGURES 4 and 5 there is shown in more detail the drive mechanism associated with each spool. As can be seen from FIGURE 4, the mechanism is housed in a generally cylindrical housing 59 having end plates 60 and 61. Bearings 62 and 63 centrally located in the end plates 60 and 61 respectively support a shaft 64 which is an output shaft driving a spool holder 65.

Freely mounted for rotation on the shaft 64 is an input gear 66 which is driven from the motor from the gear box 15 and the gears 17, 18 as shown in FIGURE 1. Integral with the input gear 66 is the sun gear 67 having a planet gear 68 supported on a carrier wheel 69 which is pinned to the output shaft 65. Integral with the planet gear 68 is a further planet gear 70 in mesh with a further sun gear 71, freely mounted for rotation on the shaft 65. Bolted to the sun gear 71 is a circular disc 72. The gear 71 and the disc 72 are arranged to have limited axial movement so that when the magnetic clutch 20, which is bolted to the end plate 62, is energised, the plate 72 is attracted towards the pressure plate 73 and thereby restrained from rotating. The clutch 20 may be of conventional construction and, since the shaft 65 passes through the clutch, may comprise an annular core having a toroidal winding which is energised when necessary as hereinbefore described with reference to FIGURE 3.

When the clutch 20 is deenergised, the sun gear 71 is free to rotate and rotation of the input gear 66 by the gear 18 causes rotation of the sun gear 71 only. With the clutch energised however, the gear 71 is restrained from rotation and rotation of the input gear 66 causes the planet gear to traverse the circumference of gear 71, causing the rotation of the carrier wheel 69 and rotation of the output shaft 65.

Also within the housing 59 is a free wheel device which is arranged to apply frictional resistance only to one direction of rotation of the output shaft 65. Pinned to the shaft 65 is a drive ring 74 constituted by two integral collars 75 and 76. The collar 75 has three wedge-shaped cavities 77 spaced at 120° intervals about its periphery. As can be most easily seen in FIGURE 5, which is a sectional view of the central portion of the drive ring assembly, the sides of each cavity 77 are constituted by flat surfaces 78 and 79 in the drive ring and the inner surface of a cylindrical flange 80 of a disc 81, freely mounted for rotation on the collar 76 which is pinned to the shaft 65. A spherical steel ball 82 is located in each cavity, which is bounded in the axial directions by the surface 83 in the collar 75 and the central portion of the disc 81. Each ball is supported against the flange 80 by a spring 84 in a recess 85 in the surface 78 and by the head of a rivet 86 located in a further recess 87 in the surface 79. A pressure ring 88, having a stepped face 89 retaining a friction washer 90 between the face 89 and the outer flange 91 of the disc 81 is supported by three springs 92 spaced at 120° intervals about the pressure ring and located at one end in recesses 93 in the pressure ring and corresponding recesses 94 in a pressure plate 95. The pressure plate is fixed to the casing by three screws 96 which pass through the end plate 60. The springs urge the pressure ring towards the disc 81, which may be prevented from rotational movement by flanges in the housing engaging recesses in the ring's periphery, and the pressure on the pressure ring 88 may be adjusted by altering the position of the plate 95 on the screws 96. The screws 96 are locked by the lock nuts 97.

The above described mechanism operates as follows. When the output shaft 64 is rotating the spool to wind on the chart, that is rotating clockwise in FIGURE 5, the drive ring 74 rotates freely with respect to the disc 81. When the clutch is disengaged and the output shaft 64 is being rotated by the pull of the chart from the other spool, the three balls 82 become wedged between the surface 79 and the flange 80, locking the drive ring to the disc 81. As the drive ring and the disc rotate together, there is frictional drag between the outer portion of the disc 81 and the friction washer 90. The mechanism thus provides frictional drag resisting rotation of a trailing spool only, which substantially reduces the power needed for the drive. The drag would normally be adjusted by altering the position of the plate 95 on the screws 96 to a value sufficient to keep the chart taut.

The lower portion of FIGURE 4 shows the resetting mechanism for winding the chart rapidly onto a spool. A nylon cord 100, having a knob 101 attached to its upper end passes through a cord guide 102 in the housing 60 to the grove 103 in the carrier wheel 69. The cord extends twice around the peripheral groove and passes out of the housing 60, via the cord guide 104 round a small pulley 105 to the barrel 100, mounted on a shaft 111, the cord being wrapped for one and a half turns round the barrel before being attached to a lug 107 on the barrel. It will be appreciated that the view of the barrel has been chosen for simplicity; normally the barrel 106 would be located with its axis parallel to the shaft 64 as shown in FIGURE 1. When the cord is pulled, the barrel 106 rotates around the shaft 111 until a dowell pin 108, located near the middle of a radius of the end plate of the barrel, strikes a quadrantally shaped stop plate 109 which is mounted on the collar 110 on the shaft. The stop plate is then rotated for three quarters of a revolution before its leading edge 112 strikes the stop 113 which is securely attached to the mounting of the apparatus (not shown).

Inside the barrel is a pin attached to the outer coils of a spring inside the barrel so that rotation of the barrel by pulling of the cord tightens the spring. It will be seen that the spring will normally keep the dowel pin in the position shown in FIGURE 4 since there is negligible friction between the cord and the carrier wheel if the cord is not pulled.

The barrel thus rotates through a maximum of one and a half revolutions and the consequent rotation of the carrier wheel causes the chart to be wound on by the corresponding distance. When the knob is released, the spring in the barrel drives the barrel to wind back the cord is to its original position; there would usually be a reset mechanism provided for each spool to enable an operator to move the chart in either direction. It will be appreciated that the free wheel mechanisms also operate during resetting. When the take up spool is being rotated by the pulling of the cord, the free wheel mechanism on the trailing spool provides enough friction resisting rotation to keep the chart smooth. In like manner, the friction provided by free wheel mechanism for the take up spool prevents this spool from running back when the cord is being returned to its initial position.

During manual resetting of the chart position, the clutches must be disengaged to prevent rotation of the motor. When manual movement of the chart is effected, the electrical circuits for the clutches are opened by switches 47 and 48 in FIGURE 3 and the knob of each pull-cord is provided with an electrical contact ring 114 which completes an electric circuit between two fixed contacts 115 to form one of the switches 47 and 48. For simplicity, the leads to the contacts have not been shown in FIGURE 4. It will be readily apparent from FIGURE 4 that when the cord is pulled by the knob, the contact between the contacts 114 and 115 is broken and, as shown in FIGURE 3, the opening of the switch will disengage the clutch 20 and the associated spool may be manually rotated without damage to the clutch or motor.

In the simplest form, the chart position indicating apparatus may be used as a dead-reckoning chart indicator making the assumption that the aircraft is moving along the required track at a known speed. In such an arrangement the motor 14 would be a constant speed motor. The variable speed gear 15 in this arrangement would be set in accordance with the speed of the aircraft. Very conveniently for this purpose the gear is a double cone gear system having a calibrated control member for adjusting the speed ratio of the gear so that the speed ratio may be set in accordance with the speed of the aircraft. Although the gear 15 is shown in the drive between the motor and the two gear trains 18, 19 it may in some cases be more convenient, in such a dead-reckoning computer, to provide this variable speed gear between the shafts 16 and 34 in the drive to the contact arm 30, leaving the inputs to the clutches 20, 21 being driven at constant speed from the motor 14. In this dead-reckoning computer, the stylus 13 might be a fixed marker conveniently half way across the width of the chart strip or may be mounted for manual adjustment across the chart strip. The chart strips used in the apparatus would be formed so that the required flight paths of the aircraft passes down the centre of the strip. At any turning point in a flight path, the maps may be cut and joined at a suitable angle so that the flight path continues down the centre of the strip. This arrangement forms a particularly convenient and simple form of dead-reckoning computer suitable for use by a pilot of high speed aircraft. The computer is set up before the aircraft departs with the appropriate chart and with the variable speed gear adjusted to the planned flight speed; the pilot sets the apparatus in operation on starting his journey and then, at any time, by looking at the position of the stylus relative to the chart, can see the dead-reckoning chart position assuming that the aircraft has flown along the required path at the expected speed.

FIGURE 1 however shows a chart position indicating apparatus for indicating the aircraft position as determined by a Doppler navigation equipment which is indicated diagrammatically at 50. This navigation equipment provides outputs representative of the movement of the aircraft over the ground and, in this particular arrangement, it is very convenient to have outputs representative of the movements in the direction of and transverse to the flight path. The movement in the direction of the flight path is used to control the motor 14 so that this motor is now driven to rotate the shaft 34 according to the movement of the aircraft along the track determined by this Doppler navigation equipment. The movement across the track is used to control a motor 51 which through a reduction gear 52 drives a spool 53 for traversing the stylus 13 transversely across the chart 10. The stylus for this purpose is a marking on an endless strip 54 one end of which passes over a driving roller 53. The strip 54 extends across the chart between the roller 53 and a second roller 55. By using an endless strip 54, the stylus 13 can be driven beyond the edge of the chart strip and subsequently returned without any need for manual resetting if the aircraft should fly outside the area covered by the chart.

The motor 51 is a reversible drive motor for driving the roller 53 in either direction as required. It will thus be seen that the chart strip 10 is moved in accordance with the component of the determined speed of the aircraft in one direction and the stylus 13 is moved across the chart in accordance with the component of the speed in the transverse direction. The actual position of the aircraft is thus continuously plotted.

I claim:

1. Apparatus having a chart in the form of a strip carried on two spools which chart is traversed past an indicating or marking stylus, wherein there are provided a reversible motor, drive transmission means for each spool arranged to be alternatively driven by said motor to traverse the chart in either direction, said transmission means including a clutch and means for disengaging said clutch when the speed of traverse of the chart exceeds a desired rate, and, associated with each spool, a friction brake resisting rotation of the spool and unidirectional drive means arranged to operate said friction brake only when chart is being wound off the spool.

2. Apparatus having a chart in the form of a strip carried on two spools which chart is traversed past an indicating or marking stylus, wherein there are provided a reversible motor, drive transmission means for each spool arranged to be alternatively driven by said motor to traverse the chart in either direction, said transmission means including a clutch and means for disengaging said clutch when the speed of traverse of the chart exceeds a desired rate, and, associated with each spool, a rotatable member, unidirectional drive means to drive said rotatable member only when the chart is being wound off the spool and means for applying friction to said rotatable member to resist the rotation thereof.

3. Apparatus as claimed in claim 2 wherein said unidirectional drive means comprises a driving member having a plurality of peripheral wedge shaped cavities, and a ball located in each of said cavities, one wedging surface being constituted by the driving member and the other by said rotatable member.

4. Apparatus having a chart in the form of a strip carried on two spools which chart is traversed past an indicating or marking stylus, wherein there are provided a first rotatable member frictionally engaging the chart to be driven thereby as the chart moves, a second rotatable member, means for turning said second rotatable member in accordance with the required movement of the chart, spool drive means for each spool each including a clutch, which drive means, when the clutch is engaged, traverse the chart at a speed greater than the required maximum speed of traverse of the chart relative to the stylus, comparator means responsive to the rotations of said first and second rotatable members and operative to disengage said engaged clutch when the rotational movement of said first rotatable member exceeds the rotational movement of said second rotatable member, means for driving either of said spool drive means alternatively whereby the chart may be traversed in either direction, and, associated with each spool, a further rotatable member unidirectional drive means to drive said further rotatable member only when the chart is being wound off the spool, and means for applying friction to said further rotatable member to resist the rotation thereof.

5. Apparatus as claimed in claim 4 wherein said means for applying friction to said further rotatable member comprises a fixed member, and spring means maintaining said fixed member in frictional contact with said rotatable member.

6. Apparatus as claimed in claim 4 and arranged as an airborne dead reckoner, means being provided for turning said second rotatable member in accordance with the speed of the aircraft.

7. Apparatus as claimed in claim 4 wherein means are provided for moving the stylus in a direction transverse to the direction of movement of the chart.

8. Apparatus having a chart in the form of a strip carried on two spools past an indicating or marking stylus wherein there are provided, a reversible motor, spool drive means for each spool arranged to be alternatively driven by said motor to traverse the chart in either direction, said spool drive means including a clutch, means for disengaging said clutch when the speed of traverse of the chart exceeds a desired rate, a rotatable member, unidirectional drive means to drive said first rotatable member only when the chart is being wound off the spool, means for applying friction to said rotatable member to resist the rotation thereof, epicyclic transmission means including a planet gear carried on a second rotatable member, said second rotatable member being arranged to drive said spool when rotated, and means for rotating said second rotatable member to traverse said chart independently of said motor.

9. Apparatus as claimed in claim 8 wherein said second rotatable member is rotated in one direction by a pull cord which grips said member when pulled, the cord being spring loaded so that the cord returns to a datum position when released.

10. Apparatus as claimed in claim 9 wherein said cord rotates a rotatable element when pulled, said rotatable element having spring means resisting rotation in the direction of pull of the cord and stop means to limit the rotation of the element to a determined maximum angle.

11. Apparatus having a chart in the form of a strip carried on two spools which chart is traversed past an indicating or marking stylus and arranged for use in an aircraft having Doppler airborne navigation system arranged to provide two sets of output signals representative of the components in orthoganal directions of the ground speed of the aircraft, wherein there are provided a first rotatable member frictionally engaging the chart to be driven thereby as the chart moves, a second rotatable member, means responsive to one set of output signals from the Doppler signal for driving said second rotatable member in accordance with the speed of the aircraft in a first direction, spool drive means for each spool each including a clutch, which drive means, when the clutch is engaged, traverse the chart at a speed greater than the required maximum speed of traverse of the chart relative to the stylus, comparator means responsive to the rotations of said first and second rotatable members and operative to disengage said engaged clutch when the rotational movement of said first rotatable member exceeds the rotational movement of said second rotational member, means responsive to said second set of signals and arranged to drive said stylus across the chart in accordance with the component of ground speed in the direction transverse to said first direction, means for driving said spool drive means alternatively whereby the chart may be traversed in either direction, and associated with each spool, a further rotatable member, unidirectional drive means arranged to drive said further rotatable member only when the chart is being wound off the spool, and means for applying friction to said further rotatable member to resist the rotation thereof.

12. Apparatus having a chart in the form of a strip carried on two spools which chart is traversed past an indicating or marking stylus, wherein there are provided a first rotatable member frictionally engaging the chart to be driven thereby as the chart moves, a second rotatable member, means for turning said second rotatable member in accordance with the required movement of the chart, spool drive means for each spool each including a clutch, which drive means, when the clutch is engaged traverses the chart at a speed greater than the required maximum speed of traverse of the chart relative to the stylus comparator means responsive to the rotations of said first and second rotatable members and operative to disengage said clutch when the rotational movement of said first rotatable member exceeds the rotational movement of said second rotatable member, means for driving said spool drive means alternatively whereby the chart may be traversed in either direction, and associated with each spool, a further rotatable member, unidirectional drive means to drive said further rotatable member only when chart is being wound off the spool, means for applying friction to said further rotatable member, epicyclic transmission means including a planet gear carried on a fourth rotatable member, said fourth rotatable member being arranged to drive said spool when rotated, a pull cord arranged to rotate said fourth rotatable member when pulled, the cord being spring loaded so that the cord returns to a datum position when released and having a connecting member which completes the energising circuit to said clutch when said cord is in said datum position.

References Cited by the Examiner
UNITED STATES PATENTS

| | | | |
|---|---|---|---|
| 2,266,449 | 12/1941 | Ullrich et al. | 346—8 |
| 2,781,948 | 2/1957 | Buslik et al. | 242—75.51 |
| 2,791,933 | 5/1957 | Crockett | 242—75.51 |

RICHARD B. WILKINSON, *Primary Examiner.*